(12) United States Patent
Sykula et al.

(10) Patent No.: US 11,279,325 B2
(45) Date of Patent: Mar. 22, 2022

(54) SENSOR CLEANING

(71) Applicants: Ford Global Technologies, LLC, Dearborn, MI (US); Valeo North America, Inc., Auburn Hills, MI (US)

(72) Inventors: Andre Sykula, Sterling Heights, MI (US); Venkatesh Krishnan, Canton, MI (US); Segundo Baldovino, Novi, MI (US); Steven Marshall, Auburn Hills, MI (US); Michael Whitney, Auburn Hills, MI (US)

(73) Assignees: Ford Global Technologies, LLC, Dearborn, MI (US); Valeo North America, Inc., Troy, MI (US)

( * ) Notice: Subject to any disclaimer, the term of this patent is extended or adjusted under 35 U.S.C. 154(b) by 437 days.

(21) Appl. No.: 16/450,196

(22) Filed: Jun. 24, 2019

(65) Prior Publication Data
US 2020/0398795 A1    Dec. 24, 2020

(51) Int. Cl.
*B60S 1/52* (2006.01)
*B08B 5/02* (2006.01)
*B60S 1/54* (2006.01)
*B08B 3/02* (2006.01)
*G05D 1/02* (2020.01)
*B60S 1/50* (2006.01)

(52) U.S. Cl.
CPC ...... *B60S 1/52* (2013.01); *B08B 3/02* (2013.01); *B08B 5/02* (2013.01); *B60S 1/54* (2013.01); *B60S 1/50* (2013.01); *G05D 1/021* (2013.01)

(58) Field of Classification Search
CPC ...... B60S 1/52; B60S 1/54; B60S 1/50; B08B 3/02; B08B 5/02; G05D 1/021

USPC .................................................. 134/99.1
See application file for complete search history.

(56) References Cited

U.S. PATENT DOCUMENTS

| | | | | |
|---|---|---|---|---|
| 3,453,049 | A * | 7/1969 | Wager, Jr. | G01N 21/15 356/73 |
| 5,657,929 | A * | 8/1997 | DeWitt | B60S 1/52 15/250.02 |
| 6,199,773 | B1 * | 3/2001 | Holt | B05B 7/08 239/284.1 |
| 9,663,073 | B2 * | 5/2017 | Tanaka | B60R 1/00 |
| 9,863,866 | B2 | 1/2018 | Bugher et al. | |
| 10,328,906 | B2 * | 6/2019 | Hester | B60S 1/56 |
| 10,807,568 | B2 * | 10/2020 | Mizuno | B05B 7/0815 |
| 2002/0005440 | A1 * | 1/2002 | Holt | B60S 1/54 239/284.2 |
| 2006/0068696 | A1 * | 3/2006 | Ashford | G08B 13/18 454/188 |

(Continued)

FOREIGN PATENT DOCUMENTS

| | | |
|---|---|---|
| CN | 106740708 A | 5/2017 |
| EP | 2605043 B1 | 7/2014 |

*Primary Examiner* — Michael E Barr
*Assistant Examiner* — Thomas Bucci
(74) *Attorney, Agent, or Firm* — Frank A. MacKenzie; Bejin Bieneman PLC (57) ABSTRACT

An apparatus includes a sensor lens defining an axis, a first nozzle and a second nozzle positioned a same perpendicular direction from the axis and spaced along a direction parallel to the axis, and an air source fluidly connected to the nozzles. The nozzles are oriented to emit respective airstreams intersecting the axis and directed apart at an acute angle.

20 Claims, 6 Drawing Sheets

(56) References Cited

U.S. PATENT DOCUMENTS

| | | | |
|---|---|---|---|
| 2009/0250533 A1* | 10/2009 | Akiyama | B60S 1/58 239/284.1 |
| 2011/0073142 A1* | 3/2011 | Hattori | B60S 1/54 134/56 R |
| 2011/0266375 A1* | 11/2011 | Ono | B60S 1/54 239/589 |
| 2011/0292212 A1* | 12/2011 | Tanabe | B60S 1/56 348/148 |
| 2012/0117745 A1* | 5/2012 | Hattori | B60S 1/54 15/250.01 |
| 2013/0092758 A1* | 4/2013 | Tanaka | B60S 1/52 239/284.1 |
| 2014/0060582 A1* | 3/2014 | Hartranft | B60S 1/528 134/18 |
| 2015/0040953 A1* | 2/2015 | Kikuta | B60S 1/52 134/123 |
| 2015/0151722 A1* | 6/2015 | Gokan | B60S 1/50 134/102.2 |
| 2015/0183406 A1* | 7/2015 | Tanaka | B60R 1/00 134/99.1 |
| 2015/0185592 A1* | 7/2015 | Eineren | G02B 27/0006 348/375 |
| 2015/0296108 A1* | 10/2015 | Hayakawa | B60S 1/52 348/148 |
| 2016/0103316 A1* | 4/2016 | Rousseau | B60R 1/00 359/509 |
| 2016/0272165 A1 | 9/2016 | Hsiao et al. | |
| 2016/0311405 A1* | 10/2016 | Richardson | B60S 1/60 |
| 2016/0339875 A1* | 11/2016 | Ina | B60S 1/522 |
| 2016/0368029 A1* | 12/2016 | Augustyn | G01J 1/42 |
| 2017/0225660 A1* | 8/2017 | Trebouet | A47L 7/0023 |
| 2017/0297536 A1* | 10/2017 | Giraud | B08B 5/02 |
| 2017/0313286 A1* | 11/2017 | Galera | B60S 1/52 |
| 2018/0015907 A1* | 1/2018 | Rice | B60S 1/56 |
| 2018/0015908 A1 | 1/2018 | Rice | |
| 2018/0186341 A1* | 7/2018 | Kimura | B60S 1/56 |
| 2018/0312141 A1* | 11/2018 | Ghannam | B60S 1/56 |
| 2018/0361997 A1* | 12/2018 | Schmidt | B60S 1/54 |
| 2019/0068845 A1* | 2/2019 | Krishnan | B60Q 1/2661 |
| 2019/0077376 A1* | 3/2019 | Baldovino | B60S 1/52 |
| 2019/0077377 A1* | 3/2019 | Schmidt | B08B 5/02 |
| 2019/0100168 A1* | 4/2019 | Krishnan | B60S 1/56 |
| 2019/0111895 A1* | 4/2019 | Onuma | B60S 1/56 |
| 2019/0162951 A1* | 5/2019 | Leonelli, Jr. | B60R 1/0602 |
| 2019/0184942 A1* | 6/2019 | Vaishnav | B60S 1/62 |
| 2019/0202410 A1* | 7/2019 | Zhao | G02B 27/0006 |
| 2019/0277949 A1* | 9/2019 | Krishnan | B60S 1/54 |
| 2019/0278078 A1* | 9/2019 | Krishnan | H04N 7/18 |
| 2019/0314865 A1* | 10/2019 | Sevak | B08B 5/02 |
| 2019/0337489 A1* | 11/2019 | Baldovino | G01N 21/958 |
| 2019/0337490 A1* | 11/2019 | Kawamura | B08B 5/02 |
| 2020/0189531 A1* | 6/2020 | Baldovino | B05B 9/0423 |

* cited by examiner

SENSOR CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. The sensors can be radar sensors, scanning laser range finders, light detection and ranging (LIDAR) devices, and/or image processing sensors such as cameras.

DETAILED DESCRIPTION

An apparatus includes a sensor lens defining an axis, a first nozzle and a second nozzle positioned a same perpendicular direction from the axis and spaced along a direction parallel to the axis, and an air source fluidly connected to the nozzles. The nozzles are oriented to emit respective airstreams intersecting the axis and directed apart at an acute angle.

The first nozzle may be positioned to emit the airstream at the sensor lens.

The second nozzle may be positioned to emit the airstream substantially perpendicular to the axis.

The second nozzle may be farther from the sensor lens than the first nozzle, and a cross-sectional area of the second nozzle may be greater than a cross-sectional area of the first nozzle.

The nozzles may be elongated and substantially parallel. A length of the first nozzle and a length of the second nozzle may be substantially equal. A width of the second nozzle may be greater than a width of the first nozzle.

The nozzles may be oriented substantially vertically.

The apparatus may further include a liquid nozzle directed at the sensor lens. The apparatus may further include a liquid source fluidly connected to the liquid nozzle, and a controller communicatively coupled to the air source and the liquid source and programmed to increase a pressure from the air source upon ceasing to activate the liquid source. The controller may be further programmed to decrease the pressure from the air source at a preset time after increasing the pressure from the air source.

The apparatus may further include a controller communicatively coupled to the air source and programmed to activate the air source in response to a vehicle being in a key-on state.

The apparatus may further include an exterior panel including an aperture in which the sensor lens is positioned. The apparatus may further include a nozzle shell on the exterior panel, the nozzle shell including the nozzles. The nozzle shell may include a nozzle panel facing the aperture, and the nozzle panel may include the nozzles. The nozzle shell may include a rounded shell panel bordering the nozzle panel and the exterior panel. The shell panel may include a first edge extending along the nozzle panel from the exterior panel to the exterior panel, and a second edge extending along the exterior panel from the nozzle panel to the nozzle panel.

The exterior panel may include an outside surface, and the nozzle shell may be disposed on the outside surface.

The nozzles may be elongated and substantially parallel to the exterior panel.

The second nozzle may be positioned to emit the airstream substantially parallel to the exterior panel.

With reference to the Figures, an apparatus 30 for a vehicle 32 includes a sensor lens 34 defining an axis A, a first nozzle 36 and a second nozzle 38 positioned a same perpendicular direction from the axis A and spaced along a direction parallel to the axis A, and an air source 80 fluidly connected to the first and second nozzles 36, 38. The first and second nozzles 36, 38 are oriented to emit respective airstreams intersecting the axis A and directed apart at an acute angle.

The apparatus 30 provides a cleaning airstream from the first nozzle 36 at the sensor lens 34 and an air curtain from the second nozzle 38. The cleaning airstream can dislodge debris from the sensor lens 34 through high shear force. The cleaning airstream can also dry the sensor lens 34 after cleaning the sensor lens 34 with washer fluid. The air curtain can prevent debris from contacting the sensor lens 34. The acute angle between the airstreams from the first and second nozzles 36, 38 defines a gap, and the gap can allow debris blown off of the sensor lens 34 to settle before being blown clear, rather than the airstream from the second nozzle 38 ricocheting the debris back at the sensor lens 34. The apparatus 30 provides a compact package. The apparatus 30 can provide a simple design without a need for check valves or other types of valves. The apparatus 30 can provide an energy-efficient design by allowing use of a blower rather than a compressor.

Figure 1:
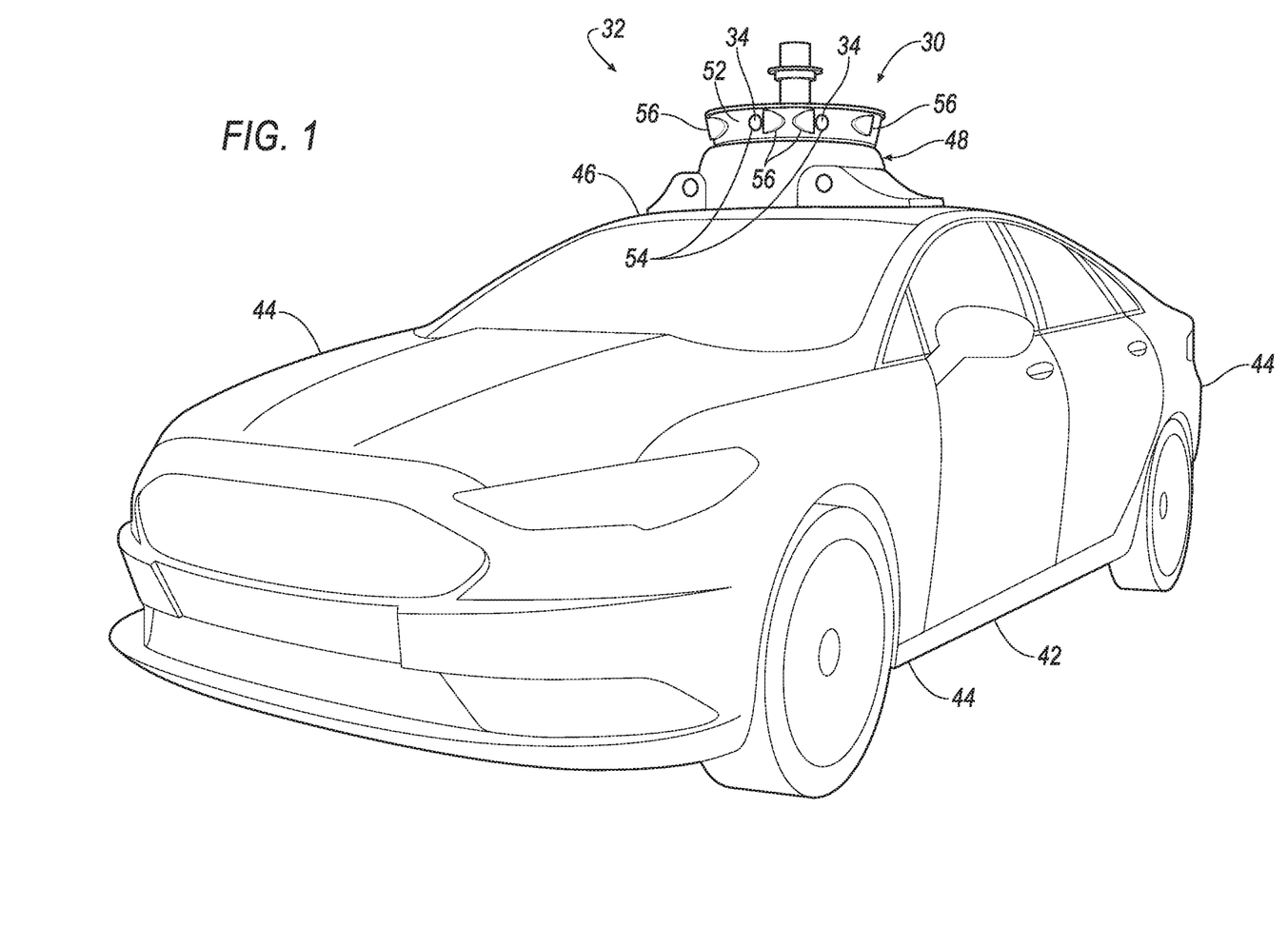
FIG. 1 is a perspective view of an example vehicle.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous vehicle. A vehicle computer can be programmed to operate the vehicle 32 independently of the intervention of a human driver, completely or to a lesser degree. The vehicle computer may be programmed to operate the propulsion, brake system, steering, and/or other vehicle systems based on data received from sensors 40. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 32 includes a body 42. The vehicle 32 may be of a unibody construction, in which a frame and the body 42 of the vehicle 32 are a single component. The vehicle 32 may, alternatively, be of a body-on-frame construction, in which the frame supports the body 42 that is a separate component from the frame. The frame and the body 42 may be formed of any suitable material, for example, steel, aluminum, etc. The body 42 includes body panels 44, 46 partially defining an exterior of the vehicle 32. The body panels 44, 46 may present a class-A surface, e.g., a finished surface exposed to view by a customer and free of unaesthetic blemishes and defects. The body panels 44, 46 include, e.g., a roof 46, etc.

A housing 48 for the sensors 40 is attachable to the vehicle 32, e.g., to one of the body panels 44, 46 of the vehicle 32, e.g., the roof 46. For example, the housing 48 may be shaped to be attachable to the roof 46, e.g., may have a shape matching or following a contour of the roof 46. The housing 48 may be attached to the roof 46, which can provide the sensors 40 with an unobstructed field of view of an area around the vehicle 32. The housing 48 may be formed of, e.g., plastic or metal.

Figure 2:
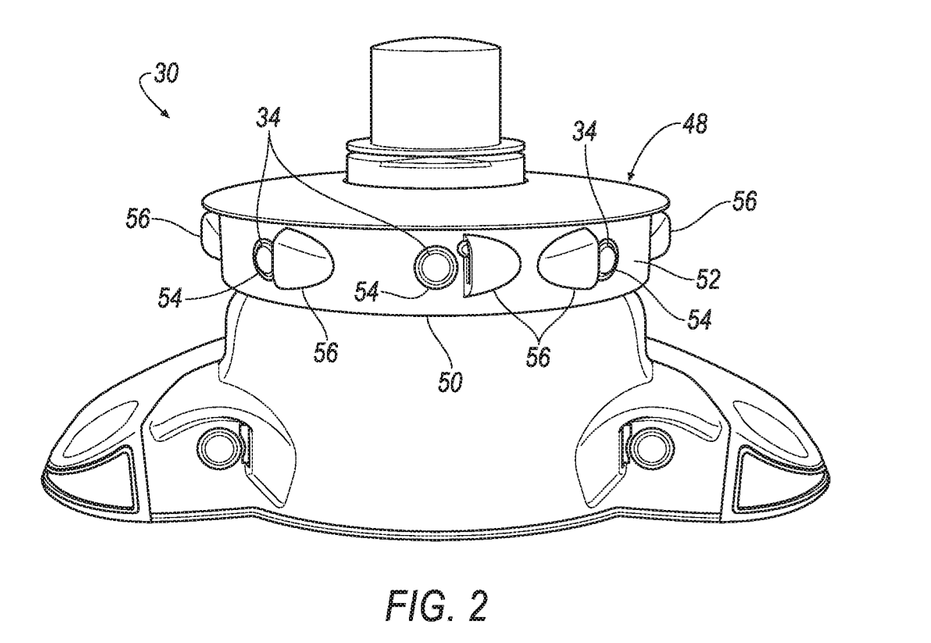
FIG. 2 is a front view of an example housing on the vehicle.

With reference to FIG. 2, the housing 48 includes an exterior panel 50. The exterior panel 50 serves as a circumferential outer wall for the housing 48, and the exterior panel 50 has a cylindrical shape defining a vertically oriented axis. The exterior panel 50 includes an outside surface 52. The outside surface 52 is the outward-facing surface of the exterior panel 50. The outside surface 52 is exposed to the ambient environment.

The housing 48 includes apertures 54 in which the sensor lenses 34 are positioned. The apertures 54 are holes in the housing 48 leading from inside the housing 48 to the ambient environment. The exterior panel 50, i.e., the outside surface 52, includes the apertures 54. The apertures 54 are through the exterior panel 50 and outside surface 52. The apertures 54 are circular in shape. The housing 48 includes a plurality of apertures 54, i.e., one aperture 54 for each of the respective sensors 40. Each sensor 40 has a field of view received through the respective aperture 54. The sensors 40 may extend into the respective apertures 54. For example, the aperture 54 may be concentric about a portion of the sensor 40.

The sensors 40 may detect the location and/or orientation of the vehicle 32. For example, the sensors 40 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 40 may detect the external world, e.g., objects and/or characteristics of surroundings of the vehicle 32, such as other vehicles, road lane markings, traffic lights and/or signs, pedestrians, etc. For example, the sensors 40 may include radar sensors, scanning laser range finders, light detection and ranging (LIDAR) devices, and image processing sensors such as cameras.

In particular, the sensors 40 disposed in the housing 48 may be one or more cameras arranged to collectively cover a 360° field of view with respect to a horizontal plane. The sensors 40 are fixedly attached directly or indirectly to the housing 48. The sensors 40 are fixed inside the housing 48. The sensors 40 are disposed on an opposite side of the exterior panel 50 from the outside surface 52. Each sensor 40 defines a field of view oriented through the respective aperture 54, and the field of view of one of the sensors 40 may overlap the fields of view of the sensors 40 that are circumferentially adjacent to one another, i.e., that are immediately next to each other. Each sensor 40 includes the sensor lens 34, and each sensor lens 34 defines the axis A. The axis A is oriented in the direction that the sensor lens 34 is facing, i.e., the axis A is substantially centered in the field of view of the sensor 40.

Nozzle shells 56 are disposed on the outside surface 52 of the exterior panel 50. The housing 48 includes one nozzle shell 56 for each aperture 54, i.e., for each sensor 40. Each nozzle shell 56 is disposed near the respective aperture 54 and is positioned horizontally from the respective aperture 54. Each nozzle shell 56 is disposed in a vehicle-forward direction from the respective aperture 54, i.e., upstream from the respective aperture 54 relative to forward motion of the vehicle 32.

Figure 3:
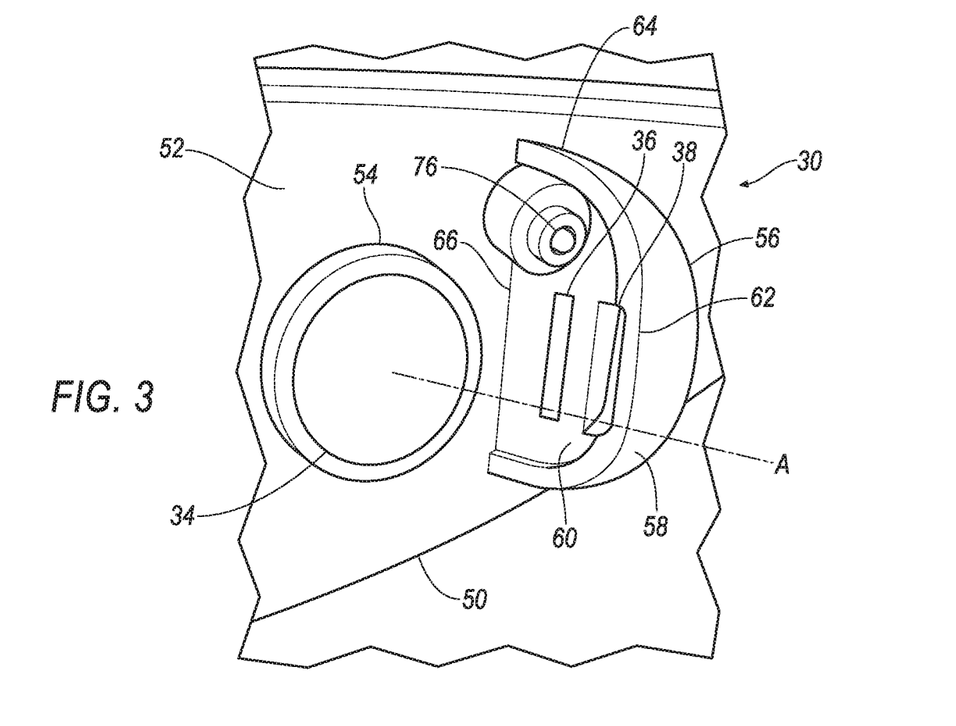
FIG. 3 is a perspective view of a portion of the housing.

With reference to FIG. 3, each nozzle shell 56 includes a shell panel 58 and a nozzle panel 60. The shell panels 58 each have a rounded shape. Each shell panel 58 borders the exterior panel 50, specifically the outside surface 52, and the respective nozzle panel 60. The shell panel 58 includes a first edge 62 extending along the nozzle panel 60 from the exterior panel 50 to the exterior panel 50, and a second edge 64 extending along the exterior panel 50 from the nozzle panel 60 to the nozzle panel 60. The first edge 62 and the second edge 64 together define a boundary of the shell panel 58.

The nozzle panel 60 has a flat shape. The nozzle panel 60 borders the exterior panel 50, specifically the outside surface 52, and the respective shell panel 58. The nozzle panel 60 includes the first edge 62 extending along the shell panel 58 from the exterior panel 50 to the exterior panel 50, and a third edge 66 extending along the exterior panel 50 from the shell panel 58 to the shell panel 58. The first edge 62 and the third edge 66 together define the boundary of the nozzle panel 60. Each nozzle shell 56 is oriented so that the respective nozzle panel 60 is facing the respective aperture 54.

Figure 4:
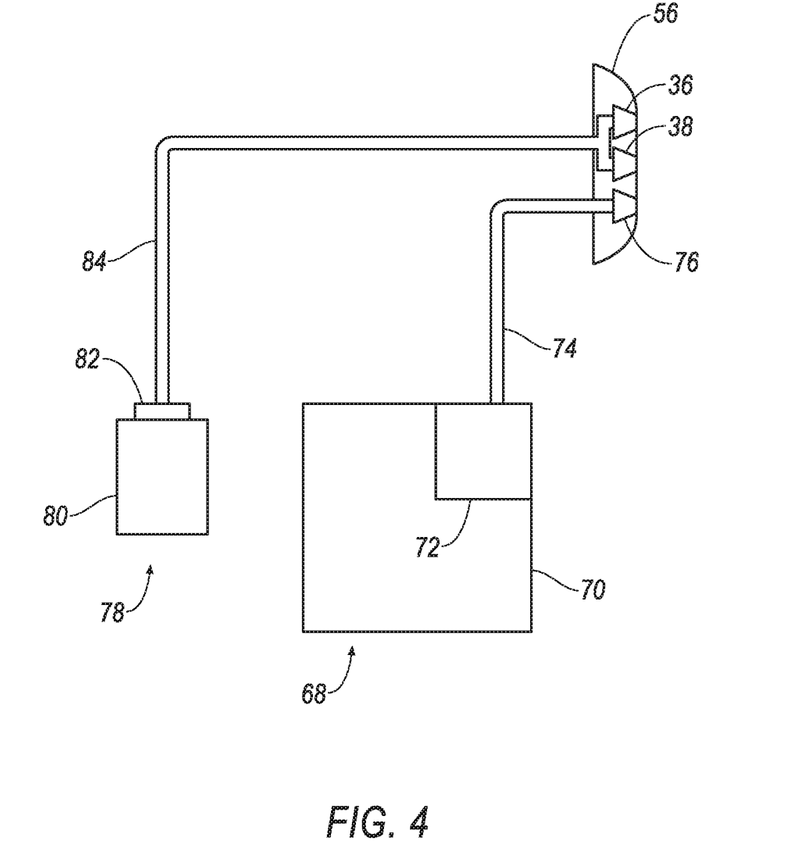
FIG. 4 is a diagram of an example cleaning system for a sensor in the housing.

With reference to FIG. 4, a liquid cleaning apparatus 68 of the vehicle 32 includes a reservoir 70, a liquid source 72, liquid supply lines 74, and liquid nozzles 76. The reservoir 70, the liquid source 72, and the liquid nozzles 76 are fluidly connected to each other (i.e., fluid can flow from one to the other). The liquid cleaning apparatus 68 distributes washer fluid stored in the reservoir 70 to the liquid nozzles 76. "Washer fluid" refers to any liquid stored in the reservoir 70 for cleaning. The washer fluid may include solvents, detergents, diluents such as water, etc.

The reservoir 70 may be a tank fillable with liquid, e.g., washer fluid for window cleaning. The reservoir 70 may be disposed in a front of the vehicle 32, specifically, in an engine compartment forward of a passenger cabin. The reservoir 70 may store the washer fluid only for supplying the sensors 40 or also for other purposes, such as supply to a windshield.

The liquid source 72 may force the washer fluid through the liquid supply lines 74 to the liquid nozzles 76 with sufficient pressure that the washer fluid sprays from the liquid nozzles 76. For example, the liquid source 72 can be a pump. The liquid source 72 is fluidly connected to the reservoir 70. The liquid source 72 may be attached to or disposed in the reservoir 70.

The liquid supply lines 74 extend from the pump to the liquid nozzles 76. The liquid supply lines 74 may be, e.g., flexible tubes.

Returning to FIG. 3, the nozzle shells 56 include the liquid nozzles 76. Each respective nozzle shell 56 includes one respective liquid nozzle 76. Each liquid nozzle 76 is directed at, i.e., oriented to discharge at, the respective aperture 54 and sensor lens 34. Each liquid nozzle 76 is disposed vertically above or below the respective first and second nozzles 36, 38.

With reference to FIG. 4, an air cleaning apparatus 78 includes the air source 80, a filter 82, air supply lines 84, the first nozzles 36, and the second nozzles 38. The air source 80, the filter 82, and the first and second nozzles 36, 38 are fluidly connected to each other (i.e., fluid can flow from one to the other) in sequence, i.e., one after the other, through the air supply lines 84.

The air source 80 increases the pressure of a gas by reducing a volume of the gas or by forcing additional gas into a constant volume. The air source 80 may be any suitable type of blower. The first and second nozzles 36, 38 can be shaped as described below, which means that a blower can produce sufficient pressure, and the air source 80 does not need to be a compressor.

The filter 82 removes solid particulates such as dust, pollen, mold, dust, and bacteria from air flowing through the filter 82. The filter 82 may be any suitable type of filter, e.g., paper, foam, cotton, stainless steel, oil bath, etc.

The air supply lines 84 extend from the air source 80 to the filter 82 and from the filter 82 to the first and second nozzles 36, 38. The air supply lines 84 may be, e.g., flexible tubes.

Returning to FIG. 3, the nozzle panels 60 of the nozzle shells 56 include the first and second nozzles 36, 38. Each nozzle panel 60 includes one respective first nozzle 36 and one respective second nozzle 38. The first nozzle 36 and the second nozzle 38 are positioned at a same perpendicular direction from the axis A, e.g., a horizontal direction. The first nozzle 36 and the second nozzle 38 are spaced from the exterior panel 50. The first nozzle 36 and the second nozzle 38 are spaced from each other along a direction parallel to the axis A. The second nozzle 38 is farther from the sensor lens 34 than the first nozzle 36, i.e., the second nozzle 38 is farther along the direction parallel to the axis A than the first nozzle 36 from the exterior panel 50.

The first and second nozzles 36, 38 are elongated, i.e., slot-shaped, and each first and second nozzle 38 has a length equal to greater than twice its width. A length of the first nozzle 36 and a length of the second nozzle 38 are substantially equal. The first and second nozzles 36, 38 are oriented vertically relative to the vehicle 32. Each respective pair of first and second nozzles 36, 38 are substantially parallel to each other. Each first nozzle 36 or second nozzle 38 is oriented substantially parallel to the exterior panel 50. The first and second nozzles 36, 38 are vertically centered with respect to the respective nozzle panel 60. A cross-sectional area of the second nozzle 38 is greater than a cross-sectional area of the first nozzle 36, and a width of the second nozzle 38 is greater than a width of the first nozzle 36.

Figure 5:
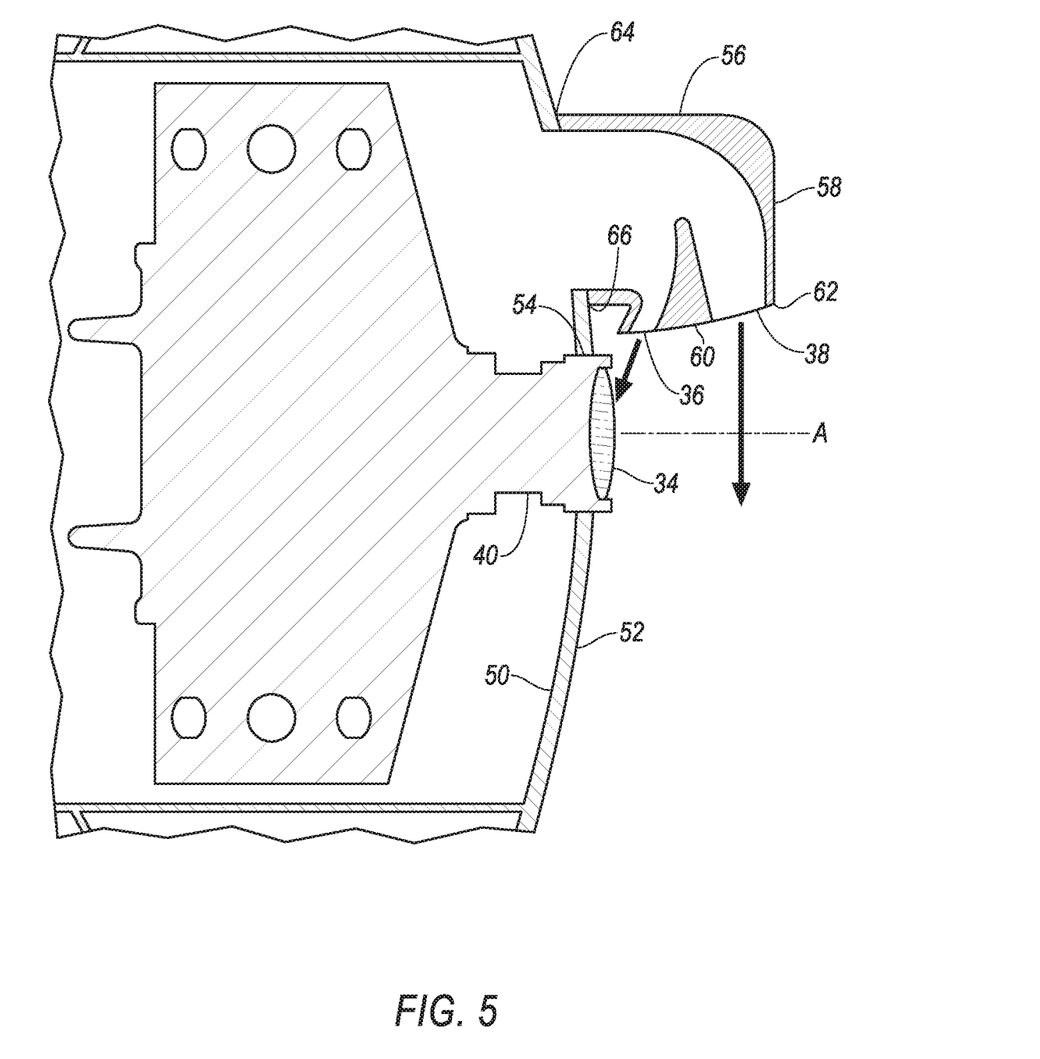
FIG. 5 is a cross-sectional view of an example nozzle shell.

With reference to FIG. 5, the first and second nozzles 36, 38 are oriented to emit airstreams intersecting the axis A, e.g., the first and second nozzles 36, 38 are oriented to emit airstreams horizontally across the respective sensor lenses 34. The first nozzle 36 is positioned to emit the airstream at the sensor lens 34. The direction of the airstream from the first nozzle 36 forms an acute angle with the sensor lens 34. The second nozzle 38 is positioned to emit the airstream substantially perpendicular to the axis A and substantially parallel to the exterior panel 50. The first and second nozzles 36, 38 are oriented to emit airstreams directed apart at an acute angle.

Figure 6:
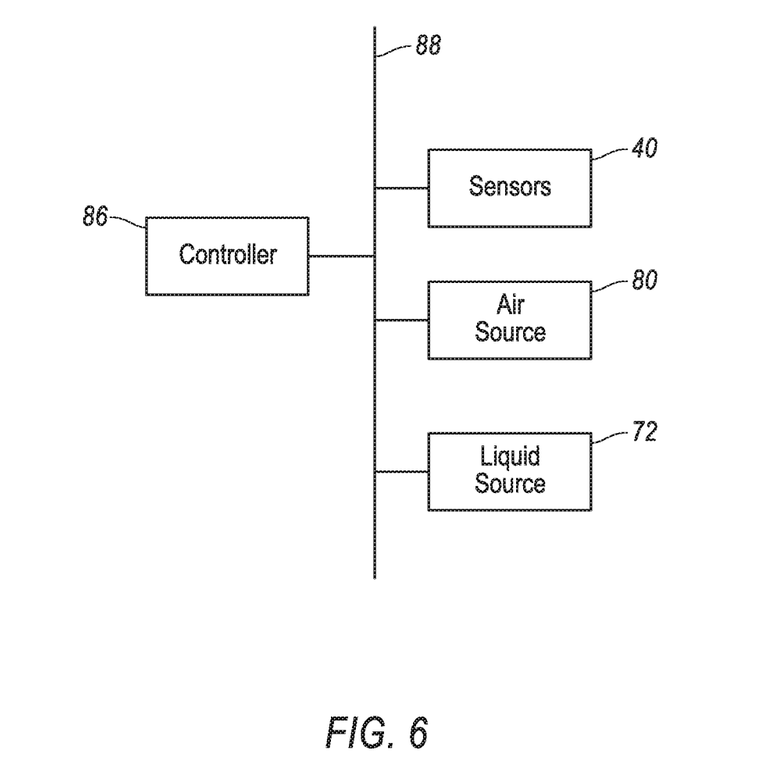
FIG. 6 is a block diagram of a control system for the cleaning system.

With reference to FIG. 6, the apparatus 30 includes a controller 86. The controller 86 is a microprocessor-based controller. The controller 86 includes a processor, a memory, etc. The memory of the controller 86 includes media for storing instructions executable by the processor as well as for electronically storing data and/or databases.

The controller 86 may transmit and receive data through a communications network 88 such as a controller area network (CAN) bus, Ethernet, WiFi, Local Interconnect Network (LIN), onboard diagnostics connector (OBD-II), and/or by any other wired or wireless communications network. The controller 86 may be communicatively coupled to the sensors 40, the air source 80, the liquid source 72, and other components via the communications network 88.

Figure 7:
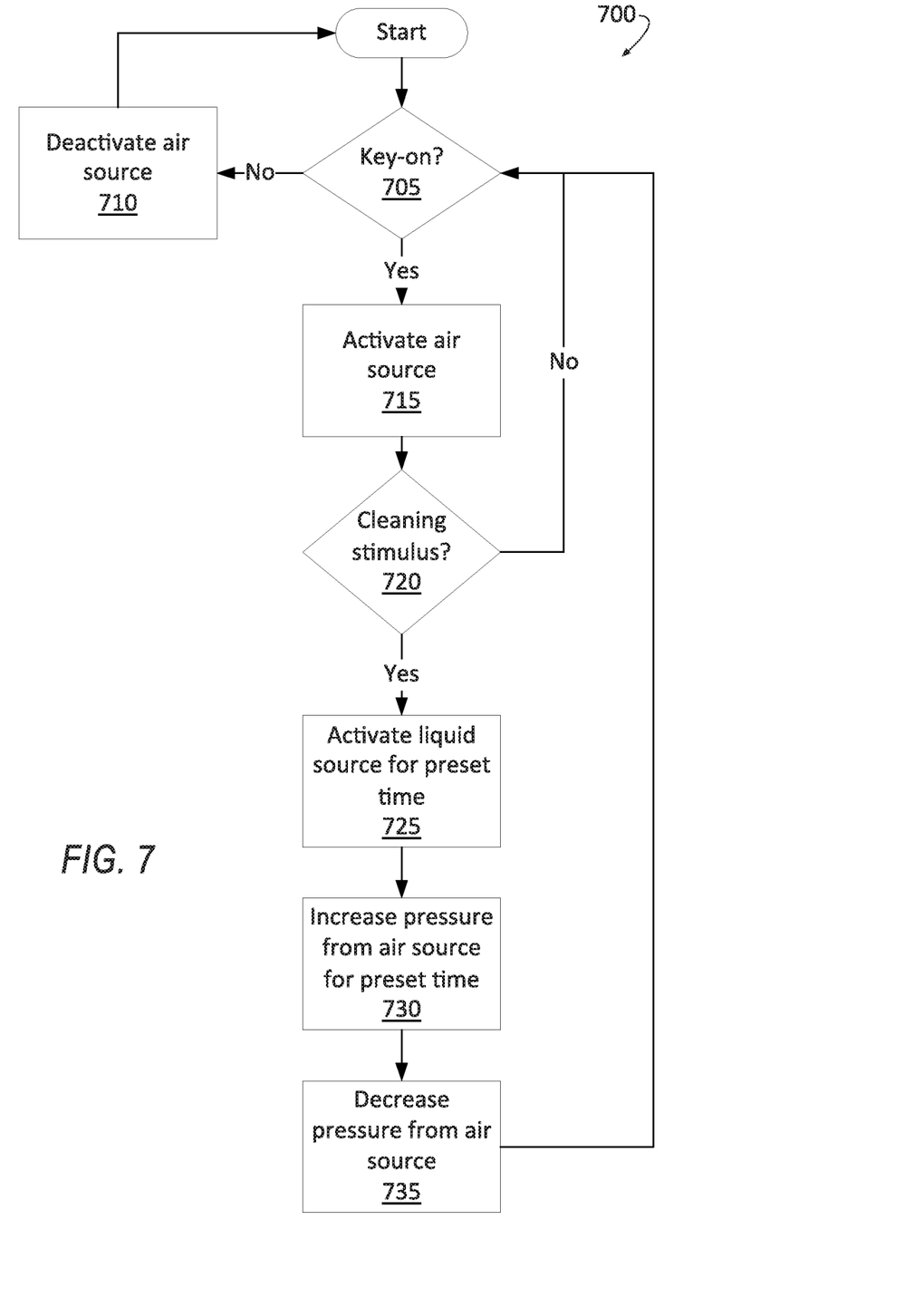
FIG. 7 is a process flow diagram of an example process for controlling the cleaning system.

FIG. 7 is a process flow diagram illustrating an exemplary process 700 for controlling the apparatus 30. The memory of the controller 86 stores executable instructions for performing the steps of the process 700. As a general overview of the process 700, the controller 86 is programmed to activate the air source 80 continuously at a default pressure while the vehicle 32 is in a key-on state, and upon determining a need to clean the sensor lens 34, activating the liquid source 72 for a first preset time and then increasing the pressure of the air source 80 for a second preset time before decreasing the pressure of the air source 80 back to the default pressure. The controller 86 runs the process 700 independently for each respective sensor 40.

The process 700 begins in a block 705, in which the controller 86 determines whether the vehicle 32 is in a key-on state, i.e., is running. The controller 86 may receive data from other computers through the communications network 88 indicating that the vehicle 32 is in the key-on state. If the vehicle 32 is in a key-off state, the process 700 proceeds to a block 710. If the vehicle 32 is in a key-on state, the process 700 proceeds to a block 715.

In the block 710, the controller 86 deactivates the air source 80. If the air source 80 is already inactive, the controller 86 maintains the air source 80 as inactive.

In the block 715, the controller 86 activates the air source 80 at a default pressure. The default air pressure for an apparatus 30 can be determined via simulation modeling and/or empirical testing, and is chosen to be sufficiently high for the airstreams from the second nozzles 38 to act as air curtains blocking debris from contacting the sensor lenses 34. The air source 80 remains active unless deactivated in the block 710.

Next, in a decision block 720, the controller 86 determines whether a cleaning stimulus has occurred. A "cleaning stimulus" is any trigger that indicates that the sensor lens 34 should be cleaned. For example, the controller 86 may receive a user command to perform cleaning of the sensor 40 or of another component of the vehicle 32 such as a windshield. For another example, the controller 86 may determine whether debris is on the sensor lens 34 based on data received from the sensor 40. For example, the controller 86 may determine, e.g., according to known image-analysis techniques, that a set of pixels in image data received from the sensor 40 is unchanging over time compared to the other of the pixels in the image data, suggesting that a portion of the field of view of the sensor 40 has been covered. In response to the lack of a cleaning stimulus, the process returns to the decision block 705 to restart the process 700. In response to a cleaning stimulus, the process 700 proceeds to a block 725.

In the block 725, the controller 86 activates the liquid source 72 for a first preset time. The first preset time may be chosen by experimenting with how long the liquid source 72 must be active to remove a variety of types of debris from the sensor lens 34.

Upon ceasing to activate the liquid source 72, in a block 730, the controller 86 increases the pressure from the air source 80 to a nondefault pressure for a second preset time. The nondefault pressure is higher than the default pressure. The nondefault pressure and the second preset time may be chosen by experimenting with different pressures and measuring how long the air source 80 must be active at those pressures to dry the sensor lens 34.

After expiration of the second preset time, in a block 735, the controller 86 decreases the pressure from the air source 80 back down to the default air pressure. After the block 735, the process 700 returns to the decision block 705 to restart the process 700.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
a sensor lens defining an axis;
a first nozzle opening and a second nozzle opening, the nozzle openings being positioned a same radial direction from the axis, the nozzle openings being spaced from each other along a direction parallel to the axis, the nozzle openings being oriented to emit respective airstreams in respective airstream directions, the airstream directions intersecting the axis, and the airstream directions diverging from each other at an acute angle; and
an air source fluidly connected to the nozzle openings.

2. The apparatus of claim 1, wherein the first nozzle opening is positioned to emit the airstream at the sensor lens.

3. The apparatus of claim 1, wherein the second nozzle opening is positioned to emit the airstream substantially perpendicular to the axis.

4. The apparatus of claim 1, wherein the second nozzle opening is farther from the sensor lens than the first nozzle opening, and a cross-sectional area of the second nozzle opening is greater than a cross-sectional area of the first nozzle opening.

5. The apparatus of claim 1, wherein the nozzle openings are elongated, and a direction of elongation of the nozzle openings is substantially parallel.

6. The apparatus of claim 5, wherein a length of the first nozzle opening along the direction of elongation and a length of the second nozzle opening along the direction of elongation are substantially equal.

7. The apparatus of claim 6, wherein a width of the second nozzle opening perpendicular to the direction of elongation is greater than a width of the first nozzle opening perpendicular to the direction of elongation.

8. The apparatus of claim 5, wherein the direction of elongation of the nozzle openings is oriented substantially vertically.

9. The apparatus of claim 1, further comprising a liquid nozzle directed at the sensor lens.

10. The apparatus of claim 9, further comprising a liquid source fluidly connected to the liquid nozzle, and a controller communicatively coupled to the air source and the liquid source and programmed to increase a pressure from the air source upon ceasing to activate the liquid source.

11. The apparatus of claim 10, wherein the controller is further programmed to decrease the pressure from the air source at a preset time after increasing the pressure from the air source.

12. The apparatus of claim 1, further comprising a controller communicatively coupled to the air source and programmed to activate the air source in response to receiving data indicating that a vehicle including the controller is in a key-on state.

13. The apparatus of claim 1, further comprising an exterior panel including an aperture in which the sensor lens is positioned.

14. The apparatus of claim 13, further comprising a nozzle shell on the exterior panel, the nozzle shell including the nozzle openings extending therethrough.

15. The apparatus of claim 14, wherein the nozzle shell includes a nozzle panel facing the aperture, the nozzle panel including the nozzle openings extending therethrough.

16. The apparatus of claim 15, wherein the nozzle shell includes a rounded shell panel bordering the nozzle panel and the exterior panel.

17. The apparatus of claim 16, wherein the shell panel includes a first edge and a second edge, the first edge extends along the nozzle panel away from the exterior panel and then back to the exterior panel, and the second edge extends along the exterior panel away from the nozzle panel and then back to the nozzle panel.

18. The apparatus of claim 14, wherein the exterior panel includes an outside surface, and the nozzle shell is disposed on the outside surface.

19. The apparatus of claim 13, wherein the nozzle openings are elongated along respective directions of elongation, and the directions of elongation are substantially parallel to a portion of the exterior panel along which the nozzle openings are elongated.

20. The apparatus of claim 13, wherein the second nozzle opening is positioned to emit the airstream substantially parallel to a plane orthogonal to the axis.

* * * * *